United States Patent [19]

Pillon et al.

[11] Patent Number: 6,090,758

[45] Date of Patent: *Jul. 18, 2000

[54] METHOD FOR REDUCING FOAMING OF LUBRICATING OILS

[75] Inventors: Lilianna Zofia Pillon, Sarnia, Canada; Patrick Desmond Fraser Vernon, Littlemore, United Kingdom; Andre Ernest Asselin, Forest, Canada

[73] Assignee: Exxon Research and Engineering Co., Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,761

[22] Filed: Jan. 7, 1997

[51] Int. Cl.[7] ............ C10M 139/00; C10G 25/00; B01D 19/04

[52] U.S. Cl. ............ 508/208; 508/107; 508/135; 516/123

[58] Field of Search .................. 252/321, 358; 508/107, 135, 208; 516/123

[56] References Cited

U.S. PATENT DOCUMENTS

| | | | |
|---|---|---|---|
| 2,416,503 | 2/1947 | Trautman et al. | 252/358 |
| 2,416,504 | 2/1947 | Trautman et al. | 252/358 |
| 2,702,793 | 2/1955 | Smith | 252/321 |
| 3,166,508 | 1/1965 | Fields | 508/448 |
| 3,660,305 | 5/1972 | Michalski | 252/321 |
| 4,031,119 | 6/1977 | Ponomarev et al. | 556/448 |
| 4,329,528 | 5/1982 | Evans | 585/3 |
| 4,411,806 | 10/1983 | Tirtiaux et al. | 252/358 |
| 4,489,201 | 12/1984 | von Au et al. | 528/42 |
| 4,626,378 | 12/1986 | Berger et al. | 252/321 |
| 4,719,247 | 1/1988 | Lin et al. | 521/159 |
| 5,059,299 | 10/1991 | Cody et al. | 208/27 |
| 5,158,671 | 10/1992 | Cody et al. | 208/264 |
| 5,466,364 | 11/1995 | Kaul et al. | 208/307 |
| 5,766,513 | 6/1998 | Pillon et al. | 516/123 |
| 5,767,192 | 6/1998 | Battice et al. | 252/321 |

FOREIGN PATENT DOCUMENTS

| | | | |
|---|---|---|---|
| 2030994 | 4/1980 | United Kingdom | C08F 220/12 |
| 2234978 | 2/1991 | United Kingdom | C08L 83/08 |
| 2244279 | 11/1991 | United Kingdom | B01D 19/04 |

OTHER PUBLICATIONS

"Lubricants and Related Products", 9.7 Antifoam Agents, month unavailable D. Klamann, Verlag Chemie, 1984, month unavailable p. 210.

"Fluoroalkoxyalkyl functional silicone polymers as foam control agents for middle distillate fuels", Res. Discl. 1991, 322, 126.

"Interfacial Phenomena in Apolar Media", Eike & Parfitt, Marcel Dekker, Inc., 1987, month unavailable pp. 7–8.

"Informaion About Dow Corning Silicone Fluids", 200 Fluid, 60,000 cs; 200 Fluid, 100,000 cs, Dow Corning Corporation, (Midland, MI), date unkown, Jan. 1999.

Derwent Abstract week 9323, London: Derwent Publications Ltd., AN 93–183144/23, class A97,CN 1064884 A(Oil Refinery Gagoqiao Petro–Chem Co), abstract, 1993.

Derwent Abstract, week 8430, London: Derwent Publications Ltd., AN 84–185816/30, class A97, J5 9105–092 A (Nishinippon Tsusho), abstract, 1984.

Derwent Abstract, week 8009, London: Derwent Publications Ltd., AN 14844C/09, class A26(A97) DT 2834–172 (Bayer AG), abstract, 1980.

*Primary Examiner*—Richard D. Lovering
*Assistant Examiner*—Daniel S. Metzmaier

[57] ABSTRACT

Foaming of a lube oil comprising a base stock derived from wax isomeration and an additive package is effectively reduced to within specification limits of 50 ml/ml over a temperature range of from at least 24° C. to 93.5° C. by adding to the oil an effective amount of an antifoamant exhibiting a spreading coefficient of at least about 2 mN/m. This has been found to be particularly effective in reducing foaming of lube oils containing a mixture of a wax isomerate oil and a petroleum oil fraction. Antifoamants typically used with conventional lube oils containing one or more petroleum fraction base stocks, but which do not exhibit a spreading coefficient of at least 2 mN/m with the wax isomerate containing oil, have been found not to be effective in reducing the foaming of the oil.

15 Claims, 3 Drawing Sheets

METHOD FOR REDUCING FOAMING OF LUBRICATING OILS

BACKGROUND OF THE DISCLOSURE

1. Field of the Invention

The invention relates to the use of a silicone fluid having a spreading coefficient of at least 2 mN/m to reduce foaming of hydrocarbon oils having a high saturates content. More particularly, the invention relates to the use of a silicone fluid having a spreading coefficient of at least 2 mN/m to reduce foaming of a hydrocarbon oil having a high saturates content, particularly a liquid wax isomerate, and to oil compositions containing a significant amount of same, including lubricating oils, such as industrial oils and internal combustion engine crankcase oil.

2. Background of the Invention

Lubricating oils (lube oils), including industrial oils and crankcase oils, used in environments in which the oil is subject to mechanical agitation in the presence of a gas entrap the gas in the form of small gas bubbles in the oil and as foam. Crankcase oils used in internal combustion engines represent a typical lube oil application in which the oil is subject to severe mechanical agitation which results in foaming and entrainment of air in the oil. Air entrainment and foaming of a lube oil can result in insufficient lubrication by preventing an effective amount of oil from reaching surfaces which are in need of lubrication. In addition to reducing the useful life of the oil due to enhanced oil oxidation, air entrainment in the oil also results in decreased engine life and increased fuel usage due to the reduced lubrication. Therefore, an antifoaming agent is added to lubricating oils used in such environments to reduce the foaming and air entrainment. Antifoaming agents must be effective over a fairly wide temperature range of from below freezing to temperatures above the boiling point of water, particularly when used with diesel and automotive crankcase oils. Some antifoaming agents eliminate foaming at lower temperatures, but not at higher temperatures and others are more effective at higher temperatures, but not lower temperatures. Increasing the amount of antifoamant may decrease the foaming tendency, but at the same time also increase the air release time of the oil. Silicone oils are known antifoamants and have been used to prevent foaming in a wide variety of lubricating oils, including industrial oils and diesel and automotive crankcase oils. However, while often (but not always) effective in reducing foaming, silicones degrade or increase the air release time of entrained air. Polyacrylates or acrylic polymers are also known antifoamants for oils and are disclosed in, for example, U.S. Pat. No. 3,166,508 and U.K. patent publication GB 2,234,978 A. Polyacrylates do not degrade the air release time of the oils to the same extent as the silicones do and have therefore replaced silicones in some applications. Unfortunately, polyacrylates are unpredictable in that they are effective with some oils, but not others. Fluorosilicones have been suggested for use as antifoaming agents in outgassing crude oils as disclosed, for example, in U.S. Pat. Nos. 4,329,528 and 4,626,378 and in British patent publication GB 2,244,279 A, but not for industrial or internal combustion engine crankcase oils.

More recently a new, premium class of hydrocarbon oil has been developed which is a wax isomerate, typically having a saturates content of greater than 99 wt %, and which is different in properties and composition than oils derived from crude oil distillates. One particular type of wax isomerate oil is derived from hydroisomerizing slack wax obtained by dewaxing a waxy petroleum oil fraction and is often referred to as a SWI, which stands for "slack wax isomerate". Lubricating oil compositions which contain one or more wax isomerate oils respond differently to antifoamants than do similar lube oils derived from crude oil distillates which do not contain a wax isomerate oil. Consequently, there is a need for being able to reduce low and high temperature foaming of a lubricating oil composition which contains a wax isomerate oil and preferably without degrading the air release time of the oil.

SUMMARY OF THE INVENTION

It has now been found that the presence of a wax isomerate oil in a lubricating oil composition increases its foaming tendency and that this foaming tendency is not effectively reduced with antifoamants typically effective with conventional lubricating oil compositions which do not contain a wax isomerate. For the sake of convenience, the term "lube oil" will hereinafter be used to signify a lubricating oil composition. The present invention relates to the discovery that the foaming tendency of a lube oil which contains a wax isomerate base stock, such as a slack wax isomerate (SWI) useful as a lube oil base stock, will exhibit less foaming if an antifoaming agent having a spreading coefficient of at least 2 mN/m is added to the oil. In a preferred embodiment of the invention the foaming tendency of the lube oil is reduced with little or no air release degradation. An antifoamant having a spreading coefficient of at least about 2 mN/m is added to the lube oil in an amount effective to reduce the foaming and preferably without increasing the air release time of the lube oil. The spreading coefficient of the antifoamant will have a value of at least about 2 mN/m throughout the temperature range over which it is desired to reduce or minimize the foaming tendency of the lube oil. Thus, in one embodiment the invention relates to a method for reducing the foaming tendency of a lube oil which contains a wax isomerate base stock which comprises adding an antifoamant having a spreading coefficient of at least about 2 mN/m in an amount effective to reduce the foaming and, preferably without increasing the air release time. In another embodiment the invention relates to a lube oil which contains a wax isomerate base oil and an antifoamant having a spreading coefficient of at least about 2 mN/m which is present in the oil in an amount effective to reduce foaming. By spreading coefficient of at least 2 mN/m is meant a value of at least about 2 millinewtons per meter of the surface tension of the lube oil, less the sum of (a) the value of the surface tension of the antifoaming agent and (b) the value of the interfacial tension between the antifoaming agent and the lube oil as is described in greater detail below. By an amount of antifoamant effective to reduce foaming is meant typically less that one weight percent of the antifoam ant in the lube oil and more typically less than 100 ppm by weight. By lube oil is meant all lube oils and particularly industrial lube oils and internal combustion engine crankcase oil. A lube oil comprises an effective amount of one or more lube oil base stocks of lubricating oil quality and one or more additives such as corrosion and oxidation inhibitors, antiwear additives, viscosity index improvers, detergents and the like. A lube oil base stock is an oil of lubricating quality typically boiling in the range of from about 300–600° C., having a suitable viscosity and viscosity index as is described in greater detail below.

It is not uncommon for a lube oil to contain two or more base stocks in order to obtain the desired properties and the invention has been demonstrated to be useful for reducing foaming of a lube oil comprising a mixture of both a conventional base stock and a wax isomerate base stock. Thus, in one embodiment the invention relates to a method for reducing foaming of a lube oil comprising a mixture of a conventional base stock and a wax isomerate base stock, which comprises adding, to the lube oil, an effective amount of an antifoaming agent having a spreading coefficient of at least 2 mN/m at the temperature at which it is desired to reduce the foaming. In another embodiment, the invention relates to a lube oil comprising a mixture of a conventional base stock and a wax isomerate base stock, and further comprising an antifoamant having a spreading coefficient of at least about 2 mN/m present in an amount effective to reduce the foaming. The invention has been demonstrated over a temperature range of from 24° C. to 93.5° C. with a lube oil useful as an internal combustion engine crankcase oil, which contained both a SWI base stock and a base stock derived by dewaxing a petroleum oil fraction boiling in the lubricating oil range.

DETAILED DESCRIPTION

Figure 1:
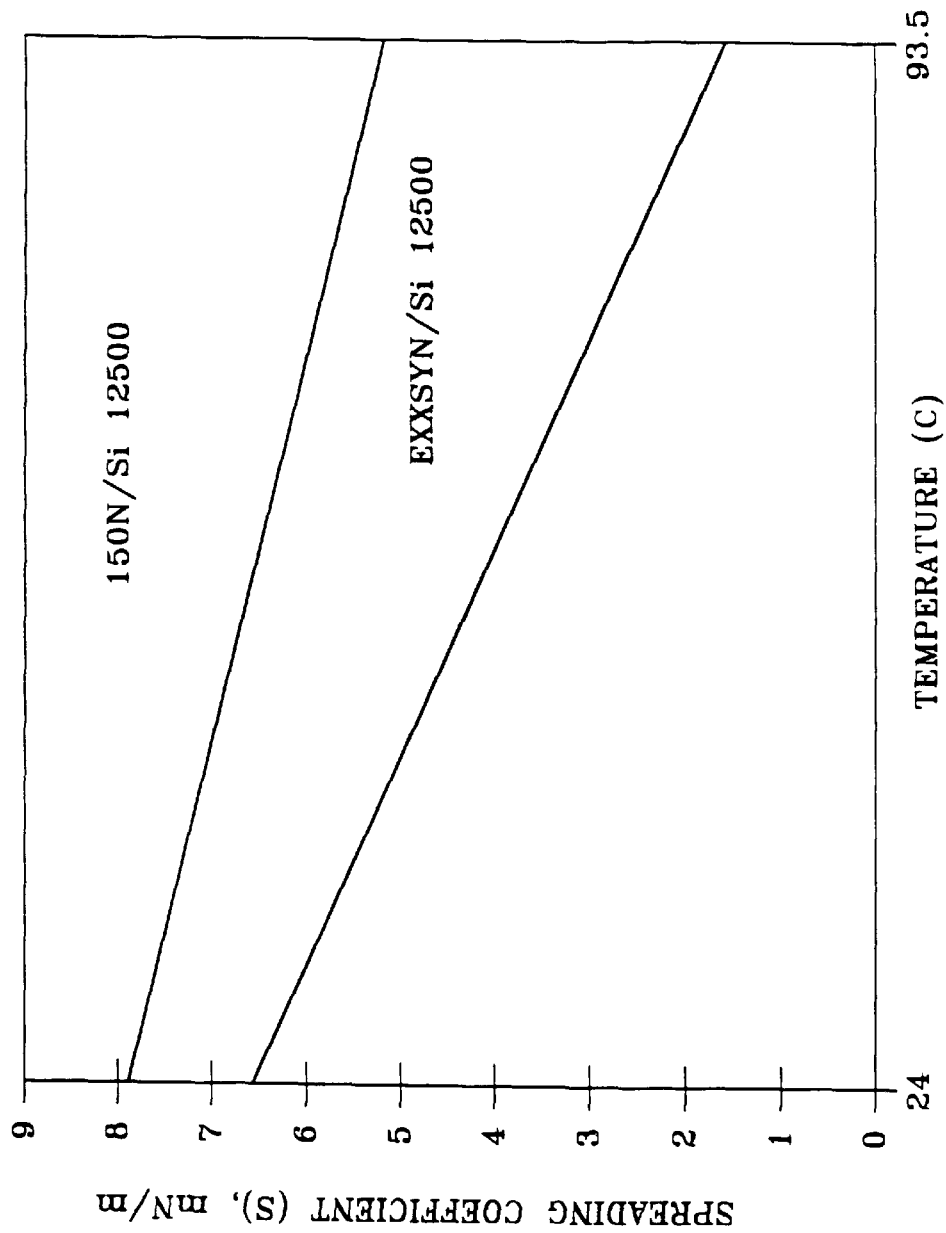
FIG. 1 is a graph showing the effect of temperature on the spreading coefficient of a typical antifoaming agent i.e., Si 12500 used for a conventional lube oil, in both a conventional base stock and a SWI base stock.

Lube oil base stocks are, as set forth above, oils of lubricating quality typically boiling in the range of from about 300–600° C., having a viscosity and viscosity index suitable for their intended use and a lube oil composition comprises one or more such lube oil base stocks, along with one or more additives such as anti-oxidants, corrosion inhibitors, detergents, dispersents, viscosity index (VI) improvers, antiwear additives, and the like. One or more of these additives will typically be carried in a lighter oil fraction and even a fraction such as kerosene, as a convenient way of incorporating a minor amount of the additive or additives to the base oil or oils during the lube oil manufacturing process, which is typically a blending process. The lubricating oil base stock or base stocks are derived from naturally occurring petroleum oil, synthetic oils, or mixtures thereof. It is not uncommon for a lube oil composition to contain two or more lube oil base stocks in order to achieve the desired lubricity and viscosity properties at the lowest cost possible. Most base stocks are derived by solvent extracting and dewaxing a suitable petroleum oil fraction. The solvent extraction removes most of the aromatics from the oil, which improves its lubricating properties and the dewaxing increases the pour point of the oil. A liquid wax isomerate or wax isomerate oil useful as a lube oil base stock also boils in the general lube oil fraction boiling range and has a viscosity, VI and other properties suitable for a lubricating oil. These wax isomerate oils are premium oils, and at least two properties which distinguish them from conventional, petroleum derived base stocks are the VI which is significantly higher, and the saturates content which is also significantly higher, typically being on the order of ≧99 wt %. The wax which is isomerized may come from any of a number of sources. Synthetic waxes from Fischer-Tropsch processes may be used, as may waxes recovered from the solvent and auto-refrigerative dewaxing of conventional hydrocarbon oils derived from petroleum oil, as well as mixtures of these waxes. Waxes derived from dewaxing conventional hydrocarbon oils are called slack waxes and usually contain an appreciable amount of oil entrained in the wax. The oil content of a slack wax may range anywhere from ≦1 to 45% or more and more typically 5 to 30%. As mentioned above, the invention has been demonstrated with a lube oil containing a mixture of both a slack wax isomerate base stock and a conventional base stock derived from solvent extracting and dewaxing a conventional petroleum oil fraction. The properties and composition of these base stocks and lube oils are contained in the examples below. The SWI oil used to demonstrate the invention is an EXXSYN® oil (EXXSYN is a registered trademark of Exxon), which is a premium synthetic oil produced by the isomerization of a slack wax which is accomplished by contacting the wax with hydrogen and a suitable catalyst at elevated temperature and pressure effective to hydroisomerize the slack wax as disclosed, for example, in U.S. Pat. Nos. 5,059,299 and 5,158,671 the disclosures of which are incorporated herein by reference. EXXSYN oil contains ≧99 wt % saturates. The practice of the invention is effective in reducing foaming tendencies of lube oils such as industrial and internal combustion engine oils which contain a wax isomerate base stock. Brief examples of industrial oils include gear oils, turbine oils, transmission and transaxle fluids, hydraulic fluids, oils for cutting, rolling and drawing metals, and the like.

Those skilled in the art know that silicones have been available for fifty years and that their primary use in petroleum and lubricating oil applications is as antifoaming agents. However, while effective in reducing and eliminating foaming in petroleum derived liquids and many other hydrocarbon oils, silicone antifoamants typically used with lube oil formulations based on petroleum distillate base stocks are not as effective with premium lube oil formulations containing a wax isomerate base stock. Silicone fluids used as antifoamants for hydrocarbon oils, including lubricating oil compositions (formulations), are typically linear polydimethylsiloxane polymers which have a chemical composition of the type $(CH_3)_3SiO[SiO(CH_3)_2]_nSiCH_3$, as an illustrative, but nonlimiting example. As is known to those skilled in the art, these silicone fluids are commercially available from various manufacturers in many different viscosities. The viscosity is a function of the molecular weight and typically ranges from about 350 cSt to 12500 cSt. While most silicone antifoamants can be added directly to the oil, they are more often diluted with a suitable solvent such as kerosene, solvent naphtha, xylene, toluene and the like to form a solution typically containing from about 0.1–90 wt % of the antifoamant. The antifoamant is added to the oil in very minor amounts, generally at parts per million (ppm) levels based on the oil content, and typically less than 100 ppm total as demonstrated in the examples below. Thus, the silicone fluid antifoamant is used in an amount effective to reduce foaming of the oil and are added to the oil in an amount generally ranging from about 1 to 300 ppm of the total composition and more typically from about 10 to 200 ppm. However, it has been found that these silicone antifoamants which have been effective in reducing the foaming tendency of conventional lube oils are not effective when used with a lube oil containing a wax isomerate base stock, such as an EXXSYN base stock derived from the isomerization of slack wax. In view of this, it was unexpected to discover that an antifoamant having a spreading coefficient of at least 2 mN/m in a lube oil composition containing a wax isomerate base oil is effective in reducing its foaming tendency/stability. Antifoamants which have been found useful in demonstrating the invention have comprised essentially high molecular weight polydimethylsiloxanes, similar to the 350 and 12500 cSt polydimethylsiloxanes typically used with compositions containing conventional lube oil base stocks, but having a substantially higher molecular weight and viscosity.

Pure liquids which contain only one type of molecule do not foam and they exhibit rapid release of entrained air. Liquids which contain mixtures of different types of molecules result in the stabilization of thin layers (lamella) of liquid at the air/liquid interface which slows the release of entrained air bubbles, thereby forming foam. A foamable liquid, such as a lube oil base stock or a lubricating oil composition contains different types of molecules which, when agitated in the presence of air or any other gas, forms a foam and the use of antifoaming agents is required to prevent or at least minimize the foaming. Foaming is generally reduced when a certain relationship between the various surface and interfacial tensions is satisfied. While not wishing to be held to any particular theory, it is believed by those skilled in the art that an antifoaming agent must spread at the air/liquid interface to prevent foaming (c.f., "Interfacial Phenomena in Apolar Media" edited by H. F. Eicke and G. D. Parfitt, Marcel Dekker, Inc. 1987). According to the theory, it will spread spontaneously if the value of the spreading coefficient S is positive, where S is given by $$S = \rho_1 - \rho_2 - \rho_{1,2}$$

wherein $\rho_1$ is the surface tension of the foamy liquid, $\rho_2$ is the surface tension of the foam-inhibiting or antifoaming agent, and $\rho_{1,2}$ is the interfacial tension between them. These surface tension and interfacial tension values are easily measured using a ring type tensiometer, such as a du Nouy Tensiometer or equivalent, following the procedure of ASTM D 1331-89, "Surface and Interfacial Tension of Solutions of Surface-Active Agents". With respect to the present invention, $\rho_1$ is the surface tension of the lube oil to which an antifoamant has not yet been added. If S is negative, the antifoaming agent may enter the air/liquid interface without spreading or it may not even be able to enter the interface, in which case foam inhibition is greatly reduced or does not occur at all. This can happen if the value of the surface tension of the antifoaming agent ($\rho_2$) or the value of the interfacial tension between the antifoaming agent and the foamy liquid ($\rho_{1,2}$) or both, is greater than the value of the surface tension of the foamy liquid ($\rho_1$). An antifoamant which has a negative spreading coefficient (S) is therefore unpredictable as to whether or not it will prevent foaming. Other factors such as solubility and dispersion can have a major effect on whether or not foaming is suppressed. However, with respect to the present invention, it has been found that not only must the spreading coefficient be positive, it must also have a minimum value of 2 mN/m for the antifoamant to be effective in reducing the foaming tendency/stability of a lube oil containing a wax isomerate oil. This phenomenon is believed to be the case irrespective of the chemistry of the antifoamant. Thus, while the invention has been demonstrated with the use of what can be described as basically comprising a high molecular weight polydimethylsiloxane, it is not intended to be limited to polydimethylsiloxane silicone fluids, or even to silicone fluids as the antifoaming agent, but is believed to be useful with any oil soluble or dispersible antifoamant exhibiting a spreading coefficient of at least 2 mN/m with the lube oil whose foaming it is desired to reduce. In the practice of the invention it is preferred that the foaming be reduced without increasing the air release time of the lube oil.

The invention will be further understood with reference to the examples below.

EXAMPLES

In all of the examples, the 100N and 150N base stock oils are solvent extracted and dewaxed paraffinic hydrocarbon oil distillates derived from a petroleum crude oil of a lubricating oil quality and boiling in the lube oil range. The EXXSYN base oil is a commercially available, high VI, synthetic hydrocarbon oil derived by the hydroisomerization of slack wax obtained from dewaxing solvent extracted lube oil fractions to form lube oil base stocks such as the 100N and 150N base stocks. It is a premium lube oil base stock. The composition and physical properties of these three lube oil base stocks are set forth in the table below.

| Base stock Property | 100N | 150N | EXXSYN |
|---|---|---|---|
| Viscosity, cSt | | | |
| @ 40° C. | 18.62 | 29.60 | 31.35 |
| @ 100° C. | 3.82 | 4.99 | 5.96 |
| Viscosity Index | 90 | 90 | 138 |
| Saturates, wt % | 84.8 | 79.9 | >99.5 |
| Aromatics/Polars, wt % | 15.2 | 20.1 | <0.5 |
| Sulphur, wt %/ppm | 0.09 | 0.12 wt % | 17 ppm |
| Total Nitrogen, ppm | 26 | 66 | 2 |
| Basic Nitrogen, ppm | 24 | 53 | 0 |
| Surface Tension, mN/m @ 24° C. | 33.2 | 33.7 | 32.8 |

The foaming tendency of the oils in all of the examples below was measured using the ASTM D 892 foam test at the temperatures of 24° C. (Seq. I foam test) and 93.5° C. (Seq. II foam test). The Seq. III test was also used and this test involves heating the sample to 93.5° C., followed by cooling down and testing at 24° C. An in-line air flow meter was used to control the air flow rate for the ASTM D 892 tests at 94.0 mL/min., instead of the 94±5 mL/min. permitted by the test, in order to improve the repeatability of the tests. A metal air diffuser was also used. The ASTM D 3427 method for gas bubble separation time of petroleum oil was used for determining the air release time of the oils in all of the examples below. This method is intended to determine the ability of a petroleum type steam turbine oil to separate entrained gas and the testing was carried out at a temperature of 50° C. Spreading coefficients were determined by measuring the surface tension of the antifoaming agent, the surface tension of the base stocks or lube oil compositions and the interfacial tension between the oil or composition and the antifoaming agent using the method in ASTM D 1331-89 "Surface and Interfacial Tension of Solutions of Surface-Active Agents" and applying the results to the spreading coefficient equation, as explained under the Detailed Description.

Comparative Example A

This example demonstrates the effectiveness of using a silicone liquid to reduce foaming of a typical 10W40 automotive crankcase oil. The silicone liquid used was a Dow Corning 200® Fluid having a viscosity of 12500 cSt as a 1% solution of the silicone in kerosene. This silicone fluid comprises a trimethyl terminated, linear polydimethylsiloxane and it is typical of silicone fluids used as antifoamants in lubricating oil compositions, including crankcase oils. The chemical nature of this fluid is described in more detail under the Detailed Description above. Table 1 below shows the composition and the foaming characteristics of the 10W40 lube oil composition without the antifoaming agent and with the antifoaming agent added. Except for the pour point depressant and the silicone, all values have been rounded off to the nearest whole number for the sake of convenience.

TABLE 1

CONVENTIONAL 10W40 LUBE OIL

| Formulation, wt % | | |
|---|---|---|
| 100N base oil | 13 | 13 |
| 150N base oil | 59 | 59 |
| Additive package | 12 | 12 |
| VI improver | 16 | 16 |
| Pour point depressant | 0.3 | 0.3 |
| 12500 cSt silicone fluid (1% solution) | — | 0.001 (10 ppm/active) |
| Foaming tendency/stability at 24° C. (Seq. I), ml/ml | 0/0 | 0/0 |
| Specifcation at 93.5° C. (Seq. II), ml/ml max 50/0 | 130/0 | 35/0 |

The results clearly demonstrate that adding the 12500 cSt silicone fluid to the lube oil composition at a treat rate of 10 ppm resulted in the lube oil easily meeting the specification maximum foaming permitted of 50/0 ml/ml. Without the silicone, the oil did not meet the minimum foaming tendency specification.

Example 1

In order to meet growing market demand for higher quality engine oils having improved low temperature performance, fuel economy and oxidation stability, automotive engine crankcase lube oils are being developed containing the highly saturated SWI premium EXXSYN oil. A premium 10W40 automotive engine crankcase oil composition containing the EXXSYN base stock is set forth in Table 2 below for which the component amounts have been rounded off to the nearest whole number except for 12500 cSt silicone fluid antifoaming agent.

TABLE 2

CONVENTIONAL 10W40 LUBE OIL

| Formulation, wt % | | |
|---|---|---|
| EXXSYN base oil | 35 | 35 |
| 150N base oil | 47 | 47 |
| Additive package | 13 | 13 |
| VI improver | 6 | 6 |
| 12500 cSt silicone (1% solution) | — | 0.001 (10 ppm/active) |
| Foaming tendency/stability at 24° C. (Seq. I), ml/ml | 0/0 | 0/0 |
| Specification at 93.5° C. (Seq. II), ml/ml max 50/0 | 230/0 | 65/0 |

Without an antifoaming agent, the foaming tendency was too high and way above specification as the data show. However, even when 10 ppm of the 12500 cSt silicone antifoamant was added, the foaming tendency at the higher temperature, while substantially reduced, was still above specification. The 12500 cSt silicone treat rate of 10 ppm is about the upper limit for this EXXSYN based premium 10W40 oil composition, as increasing the amount of the silicone added to the lube oil composition above the 10 ppm amount produces a severe air entrainment problem.

Example 2

In this experiment a lower molecular weight silicone antifoamant of a type used in internal combustion engine crankcase oil compositions and a fluorosilicone fluid which is not normally used as an antifoamant for lube oils, were each added to the 10W40 engine crankcase oil composition given in Table 2 above which contains the premium EXXSYN base stock and the lube oil compositions tested for foaming tendency/stability. Both of these two silicone fluids were obtained from Dow Corning, with the 350 cSt fluid being a 200 fluid similar to the 12500 cSt fluid used in the examples above, but of a lower molecular weight and having a viscosity of 350 cSt. The fluorosilicone fluid, hereinafter referred to as FSi 300, was a Dow Corning FS-1265 Fluid having a viscosity of 300 cSt which is sold primarily as a lubricating fluid for machining steel and bronze and is not recommended as an antifoamant. The chemistry of this fluorosilicone fluid is described in detail above. The performance of these two materials as antifoaming agents in the 10W40 lube oil composition shown in Table 2 which contains the EXXSYN oil, are given in Table 3. The results show that both of these antifoamant materials (Si 350 cSt and FSi 300 cSt) actually increased the foaming tendency/stability of the EXXSYN containing lube oil composition at the high temperature of 93.5° C., above that which the lube oil composition exhibited with no antifoamant having been added to it. All the foaming tendency/stability values of the 10W40 oil containing the EXXSYN in Table 3 are substantially above the maximum specification value of 50/0 ml/ml. Increasing the amount of antifoamant in the lube oil composition increased its foaming tendency/stability, instead of decreasing it.

TABLE 3

EXXSYN CONTAINING 10W40 LUBE OIL

| | | Foaming Tendency/Stability, ml/ml | |
|---|---|---|---|
| Antifoamant | Treat Rate (ppm) | Seq. I (24° C.) | Seq. II (93.5° C.) |
| None | 0 | 0/0 | 230/0 |
| Si 350 cSt | 5 | 0/0 | 240/0 |
| Si 350 cSt | 10 | 0/0 | 260/0 |
| FSi 300 cSt | 5 | 0/0 | 240/0 |
| FSi 300 cSt | 10 | 0/0 | 290/0 |

Example 3

In this experiment the spreading coefficient of the 12500 cSt silicone antifoaming fluid was determined using the procedure above and calculations described above. The spreading coefficients at the low and high temperatures were determined for both the 150N and EXXSYN base oils. The spreading coefficient, S, in mN/m of the Si 12500 in the 150N base oil at 24° C. and 93.5° C. was 7.9 and 5.2, respectively. In the EXXSYN base stock oil it was 6.6 and 1.6 at the same high and low temperatures. These results are graphically illustrated in FIG. 1. As the Figure shows, there is a substantial decrease in the spreading coefficient of the 12500 cSt silicone fluid in both base oils as the temperature increases, with the decrease being greatest with the EXXSYN oil.

Example 4

Based on these results, the spreading coefficient of five different silicone fluids with the EXXSYN base stock oil was determined using the same procedure. These silicones are the 350 cSt and 12500 cSt silicone fluids, the FSi 300 cSt fluorosilicone and two higher viscosity (and consequently higher molecular weight) silicone fluids similar to the 350 cSt and 12500 cSt viscosity fluids in being trimethyl terminated, linear polydimethylsiloxane Dow Coming 200® Fluids. The spreading coefficients of these silicone materials in the EXXSYN base stock are given in Table 4 below, at both the low and high temperatures and graphically illustrated in FIG. 2. The two higher molecular weight silicone fluids have respective viscosities at 25° C. of 60000 cSt and 100000 cSt and were found to have significantly higher spreading coefficients in the EXXSYN oil at the higher 93.5° C. temperature, than both the Si 12500 cSt and Si 350 cSt silicone fluids and the FSi 300 cSt fluorosilicone fluid. The spreading coefficient of both of the higher molecular weight silicone fluids was above 2 mN/m, at both the low and high temperatures.

Figure 2:
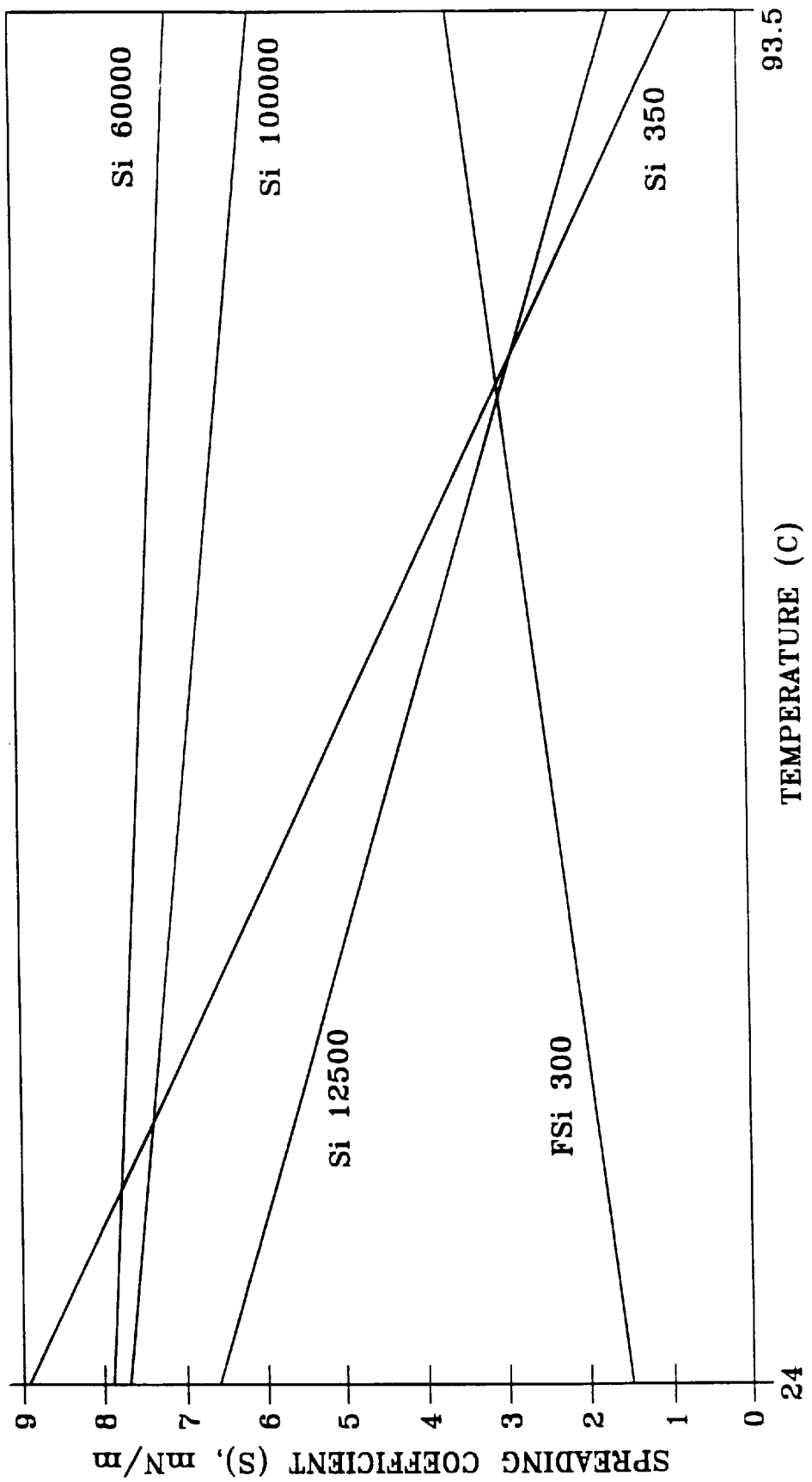
FIG. 2 is a graph illustrating the effect of temperature on the spreading coefficient of antifoaming agents in a SWI base stock.

FIG. 2 illustrates that the spreading coefficients of the Si 100000, the Si 60000 and the Si 12500 while exhibiting slightly different values, all had a positive spreading coefficient of at least 1.6 at both temperatures. Despite this, the Si 12500 was not able to reduce foaming to within the maximum specification limit of 50 ml/ml for the EXXSYN containing 10W40 oil at the 93.5° C. temperature.

TABLE 4

EXXSYN BASE STOCK

| | Spreading COefficient, S,mNm | | | | |
|---|---|---|---|---|---|
| Temperature, ° C. | Si 100000 | Si 60000 | Si 12500 | Si 350 | FSI 300 |
| 24 | 7.7 | 7.9 | 6.6 | 8.9 | 1.5 |
| 93.5 | 6.1 | 7.1 | 1.6 | 0.9 | 3.6 |

Example 5

Based on the results in Example 3, the two higher molecular weight silicone fluids having the 60000 cSt and 100000 cSt viscosities were added to the EXXSYN containing 10W40 lube oil composition at different treat rates and the oil tested for foaming Tendency/Stability. The results are given in Table 5.

TABLE 5

EXXSYN CONTAINING 10W40 LUBE OIL

| | | | Foaming Tendency/ Stability, ml/ml | |
|---|---|---|---|---|
| Antifoamant | Treat Rate (ppm) | Dilution (% solution) | Seq. I (24° C.) | Seq. II (93.5° C.) |
| None | 0 | — | 0/0 | 230/0 |
| Si 60000 cSt | 5 | Non-Diluted | 0/0 | 165/0 |
| Si 60000 cSt | 10 | Non-Diluted | 0/0 | 80/0 |
| Si 60000 cSt | 10 | 5% solution* | 0/0 | 30/0 |
| Si 60000 cSt | 5 | 5% solution* | 0/0 | 40/0 |
| Si 100000 cSt | 10 | 1% solution* | 0/0 | 10/0 |

*Solutions in kerosene.

These results demonstrate that the foaming tendency of the EXXSYN based 10W40 premium engine oil formulation at the higher 93.5° C. temperature was substantially reduced to within the 50/0 ml/ml maximum specification limit by adding either of the higher viscosity silicone fluids to the oil, with the best performance at the lowest treat rate exhibited with the 1% solution of the 100000 cSt fluid. Neither of these higher viscosity silicone fluids are recommended as antifoaming agents for oils.

Example 6

Figure 3:
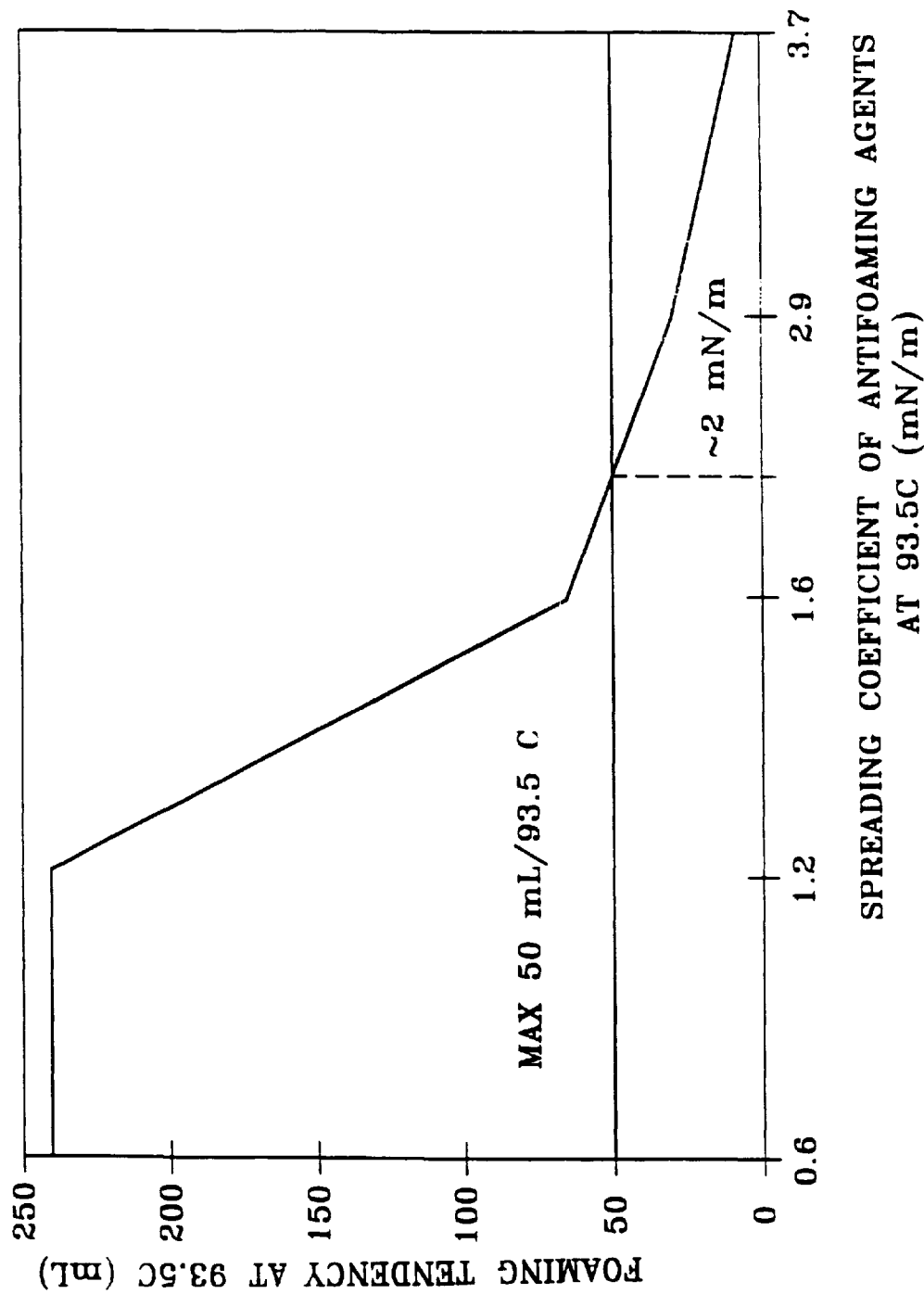
FIG. 3 graphically illustrates the foaming tendency of a lube oil containing both a conventional and a SWI base stock, as a function of the antifoamant spreading coefficient, the horizontal axis, x, presenting the spreading coefficient of antifoaming agents in mN/m at 93.5° C. in 10W40 engine oil containing SWI base stock and the vertical axis, y, presenting the foaming tendency in ml of 10W40 engine oils containing SWI base stock at 93.5° C.

Based on the results of Example 5, the spreading coefficient of the various antifoamants was measured in the 10W40 lube oil composition containing the EXXSYN oil and the results are listed in Table 6 below, along with the foaming values at 93.5° C. FIG. 3 displays the spreading coefficient values of the various antifoamants in the 10W40 formulation at the low and high temperatures. This Figure clearly discloses that the minimum spreading coefficient value for the antifoamant in the EXXSYN containing 10W40 lube oil composition must be about 2 mN/m in order for the lube oil to meet the maximum foaming specification value of 50 ml at 93.5° C.

TABLE 6

EXXSYN CONTAINING 10W40 LUBE OIL

| Antifoamant | S, mN/m | Treat Rate, ppm | Foam, ml at 93.5° C. |
|---|---|---|---|
| Si 350 | 0.6 | 5 | 240 |
| FSi 300 | 1.2 | 5 | 240 |
| Si 12500 | 1.6 | 10 | 65 |
| Si 60000 | 2.9 | 10 | 30 |
| Si 100000 | 3.7 | 10 | 10 |

Example 7

In this example, the foaming tendency/stability and air release time of the EXXSYN base oil were determined for the lower molecular weight silicone fluids and the results shown in Table 7 below. As shown in the Table, 3 ppm of Si 12500 is effective in preventing the EXXSYN base oil from foaming at both the high and low temperatures of 24° C. and 93.5° C., but the air release is degraded as seen by the significant increase in time from 1.0 min to 2.8 min. The FSi 300 was also able to keep the foaming of the EXXSYN base oil below the specification maximum of 50 ml/ml. Yet, as shown in Example 6, despite their being able to reduce the foaming of the EXXSYN base oil to below the maximum spec value, neither of these two silicone antifoamants was able to reduce the foaming of the lube oil containing the EXXSYN base stock to below the maximum value of 50 ml/ml, even at a higher treat rate.

TABLE 7

| | Treat Rate, | Foaming Tendency/Stability, ml/ml | | Air Release Time, min/ |
|---|---|---|---|---|
| Antifoamant | ppm | Seq. I (24° C.) | Seq. II (93.5° C.) | 50° C. |
| EXXSYN/Si 12500 | 3 | 0/0 | 0/0 | 2.8 |
| EXXSYN/Si 300 | 3 | 35/0 | 0/0 | 1.6 |

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A method for reducing foaming at both 24° C. and 93.5° C. of a lube oil which comprises a wax isomerate base stock, said method comprising adding to the oil an antifoamant or solvent solution thereof, consisting of a polydimethyl siloxane oil having a viscosity at 25° C. of 60,000 to 100,000 cSt and which exhibits a spreading coefficient of at least about 2 mN/m at both 24° C. and 93.5° C. with said lube oil, said antifoamant being added in an amount effective to reduce said foaming, said effective amount being about 1 to 10 ppm active ingredient based on the total lube oil.

2. A method according to claim 1 wherein said lube oil comprises a mixture of said wax isomerate oil and a petroleum oil fraction.

3. A method according to claim 2 wherein the air release time of the lube oil is not degraded by said antifoamant.

4. A method according to claim 3 wherein said wax isomerate comprises a slack wax isomerate.

5. A method according to claim 4 wherein said isomerate comprises an isomerate of Fischer-Tropsch wax.

6. The method of claim 1 wherein a solution of antifoamant is added to the oil.

7. The method of claim 6 wherein the solution contains from about 0.1 to about 90 wt % of the antifoamant.

8. The method of claim 7 wherein the solution contains 1 to 5 wt % antifoamant in kerosene.

9. A lube oil comprising an effective amount of a wax isomerate base stock oil of lubricating quality and at least one additive and an antifoamant or solvent solution thereof, said antifoamant consisting of a polydimethyl siloxane oil having a viscosity at 25° C. of 60,000 to 100,000 cSt and which exhibits a spreading coefficient of at least about 2 mN/m at both 24° C. and 93.5° C. with said lube oil, said antifoamant present in an amount effective in reducing the foaming of the lube oil at both 24° C. and 93.5° C. to a point below that which it would be if said antifoamant was not present, said effective amount being between about 1 to 10 ppm active ingredient based on the total lube oil.

10. A lube oil according to claim 9 wherein the air release time of said composition is not degraded by the presence of said antifoamant.

11. A lube oil according to claim 10 also containing a petroleum fraction base stock.

12. A lube oil according to claim 11 wherein said wax isomerate comprises a slack wax isomerate.

13. A lube oil according to claim 11 wherein said wax isomerate comprises an isomerate of Fischer-Tropsch wax.

14. The lube oil of claim 9 wherein the solution contains from about 0.1 to about 90 wt % of the antifoamant.

15. The lube oil of claim 14 wherein the solution contains 1 to 5 wt % antifoamant in kerosene.

* * * * *